(12) United States Patent
Narikiyo et al.

(10) Patent No.: US 11,429,937 B2
(45) Date of Patent: Aug. 30, 2022

(54) MAINTENANCE CONTRACT FEE CALCULATION SYSTEM

(71) Applicant: DAIKIN INDUSTRIES, LTD., Osaka (JP)

(72) Inventors: Yasutaka Narikiyo, Osaka (JP); Manabu Kiriki, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/438,966

(22) PCT Filed: Mar. 27, 2020

(86) PCT No.: PCT/JP2020/014199
§ 371 (c)(1),
(2) Date: Sep. 14, 2021

(87) PCT Pub. No.: WO2020/203842
PCT Pub. Date: Oct. 8, 2020

(65) Prior Publication Data
US 2022/0067671 A1    Mar. 3, 2022

(30) Foreign Application Priority Data
Mar. 29, 2019  (JP) .............................. JP2019-068603

(51) Int. Cl.
*F24F 11/64*   (2018.01)
*F24F 11/49*   (2018.01)
*G06Q 10/00*   (2012.01)

(52) U.S. Cl.
CPC .............. *G06Q 10/20* (2013.01); *F24F 11/49* (2018.01); *F24F 11/64* (2018.01)

(58) Field of Classification Search
CPC .......... F24F 11/64; F24F 11/49; G06Q 10/20; G06Q 30/0206
See application file for complete search history.

(56) References Cited

U.S. PATENT DOCUMENTS 10,639,577 B1 *   5/2020   Wilson, Jr. ............... F24F 11/39
10,890,904 B2 *   1/2021   Turney ............... G05B 23/0294
(Continued)

FOREIGN PATENT DOCUMENTS

| JP | 2002-106930 A | 4/2002 |
| JP | 2005-202045 A | 7/2005 |

(Continued)

OTHER PUBLICATIONS

International Search Report, issued in PCT/JP2020/014199, PCT/ISA/210, dated Jul. 7, 2020.
(Continued)

*Primary Examiner* — Nelson J Nieves
(74) *Attorney, Agent, or Firm* — Birch, Stewart, Kolasch & Birch, LLP

(57) ABSTRACT

A maintenance contract fee calculation system calculates a maintenance contract fee for an air conditioner including an indoor unit and an outdoor unit. The maintenance contract fee calculation system includes: an acquisition unit that obtains first environmental information related to an installation environment of the indoor unit and second environmental information related to an installation environment of the outdoor unit; and a calculation unit that calculates the maintenance contract fee in accordance with the first environmental information and the second environmental information.

20 Claims, 5 Drawing Sheets

| Air Conditioner ID | Device Identification Information | | Environmental Information | |
|---|---|---|---|---|
| | | | Surrounding Environment | Purpose of Installation Spot |
| 10010100 | Outdoor Unit 10010100A | Second Environmental Information | Salt Damage | Roof (Rooftop) |
| | Indoor Unit 10010100B | First Environmental Information | Oil | Kitchen |
| 10010200 | Outdoor Unit 10010200A | Second Environmental Information | Salt Damage | Roof (Rooftop) |
| | Indoor Unit 10010200B | First Environmental Information | — | Office |

(56) References Cited

U.S. PATENT DOCUMENTS

| | | | | |
|---|---|---|---|---|
| 2002/0007388 | A1* | 1/2002 | Bannai | H02J 3/008 718/104 |
| 2003/0070438 | A1* | 4/2003 | Kikuchi | G06Q 50/06 62/141 |
| 2013/0269385 | A1* | 10/2013 | Takahashi | G06F 1/206 62/513 |
| 2016/0196623 | A1* | 7/2016 | Hoff | H02J 3/381 705/30 |
| 2016/0301558 | A1* | 10/2016 | Twiss | H04L 41/147 |
| 2018/0032969 | A1* | 2/2018 | Gillette | F24F 11/52 |
| 2019/0129403 | A1* | 5/2019 | Turney | G05B 23/0294 |
| 2019/0311332 | A1* | 10/2019 | Turney | G05B 13/048 |
| 2019/0325368 | A1* | 10/2019 | Turney | G06Q 10/06315 |
| 2020/0090289 | A1* | 3/2020 | Elbsat | G06Q 50/163 |
| 2020/0284458 | A1* | 9/2020 | Yoshida | F24F 11/77 |

FOREIGN PATENT DOCUMENTS

| | | |
|---|---|---|
| JP | 2006-127070 A | 5/2006 |
| JP | 2007-140640 A | 6/2007 |
| JP | 2011-138251 A | 7/2011 |
| WO | WO 2018/217251 A1 | 11/2018 |

OTHER PUBLICATIONS

International Preliminary Report on Patentability and English translation of the Written Opinion of the International Searching Authority for International Application No. PCT/JP2020/014199, dated Sep. 28, 2021.

Extended European Search Report dated Mar. 10, 2022 in corresponding European Application No. 20783995.2.

* cited by examiner

Fig.7

| Facility ID | Air Conditioner ID | Facility Name | Address | Setting Information | Billing Address |
|---|---|---|---|---|---|
| 1001 | 10010100 10010200 ⋮ | XX Building | Osaka •• | ••• | Department AA Mr. BB |
| 1002 | 10020100 10020200 ⋮ | YY Building | Kyoto •• | ••• | Department CC Mr. DD |

Fig.8

| Air Conditioner ID | Device Identification Information | | Environmental Information | |
|---|---|---|---|---|
| | | | Surrounding Environment | Purpose of Installation Spot |
| 10010100 | Outdoor Unit 10010100A | Second Environmental Information | Salt Damage | Roof (Rooftop) |
| | Indoor Unit 10010100B | First Environmental Information | Oil | Kitchen |
| 10010200 | Outdoor Unit 10010200A | Second Environmental Information | Salt Damage | Roof (Rooftop) |
| | Indoor Unit 10010200B | First Environmental Information | — | Office |

MAINTENANCE CONTRACT FEE CALCULATION SYSTEM

TECHNICAL FIELD

The present disclosure relates to a maintenance contract fee calculation system.

BACKGROUND ART

A known maintenance contract fee calculation system calculates a maintenance contract fee for an air conditioner. The maintenance contract fee calculation system calculates the maintenance contract fee based on at least one of the device name/model name, date of installation, and application of the maintenance subject. Patent Document 1 discloses an example of a conventional maintenance contract fee calculation system.

PRIOR ART DOCUMENTS

Patent Documents

Patent Document 1: Japanese Laid-Open Patent Publication No. 2007-140640

SUMMARY OF THE INVENTION

Problems that the Invention is to Solve

When calculating a maintenance contract fee for an air conditioner, it is desirable that the failure rate of the air conditioner be taken into consideration. The failure rate of the air conditioner varies in accordance with the environment in which the air conditioner is installed. Thus, the failure rate differs between an indoor unit and an outdoor unit of the air conditioner. This is because the installation environment differs between the indoor unit and the outdoor unit. Thus, when calculating a maintenance contract fee suitable for the failure rate of the air conditioner, it is preferable that the installation environments of the indoor unit and the outdoor unit be taken into consideration.

It is an objective of the present disclosure to provide a maintenance contract fee calculation system that calculates a suitable maintenance contract fee.

Means for Solving the Problems

A maintenance contract fee calculation system that solves the problems discussed above calculates a maintenance contract fee for an air conditioner including an indoor unit and an outdoor unit. The maintenance contract fee calculation system includes an acquisition unit that obtains first environmental information related to an installation environment of the indoor unit and second environmental information related to an installation environment of the outdoor unit, and a calculation unit that calculates the maintenance contract fee in accordance with the first environmental information and the second environmental information. This configuration calculates the maintenance contract fee in accordance with the installation environment of the indoor unit and the installation environment of the outdoor unit. Thus, a suitable maintenance contract fee can be calculated in accordance with the failure rate of the air conditioner. This allows services to be provided to the client, who enters a maintenance contract, in a preferred manner.

In the maintenance contract fee calculation system, the acquisition unit preferably obtains, as the first environmental information, at least one of a location of a facility in which the indoor unit is installed, purpose of the facility, a surrounding environment of the indoor unit, and purpose of a spot in which the indoor unit is installed. This configuration includes preferable information on the installation environment of the indoor unit in the first environmental information and allows for calculation of a suitable maintenance contract fee based on the failure rate of the air conditioner.

In the maintenance contract fee calculation system, preferably, the first environmental information includes at least a surrounding environment of the indoor unit, and the surrounding environment of the indoor unit includes information about at least one of oil, humidity, water droplets, and dust. This configuration includes preferable information about the surrounding environment of the indoor unit in the first environmental information and allows for calculation of a suitable maintenance contract fee based on the failure rate of the air conditioner.

In the maintenance contract fee calculation system, the acquisition unit preferably obtains, as the second environmental information, at least one of a location of a facility in which the outdoor unit is installed, purpose of the facility, a surrounding environment of the outdoor unit, and purpose of a spot in which the outdoor unit is installed. This configuration includes preferable information about the installation environment of the outdoor unit in the second environmental information and allows for calculation of a suitable maintenance contract fee based on the failure rate of the air conditioner.

In the maintenance contract fee calculation system, preferably, the second environmental information includes at least a surrounding environment of the outdoor unit, and the surrounding environment of the outdoor unit includes information about at least one of salt damage, sand, wind and rain, and snow. This configuration includes preferable information about the surrounding environment of the outdoor unit in the second environmental information and allows for calculation of a suitable maintenance contract fee based on the failure rate of the air conditioner.

In the maintenance contract fee calculation system, preferably, the acquisition unit further obtains setting information related to a setting of the air conditioner, and the calculation unit calculates the maintenance contract fee in accordance with the first environmental information, the second environmental information, and the setting information. This configuration calculates the maintenance contract fee in accordance with the first environmental information, the second environmental information, and the setting information associated with the failure rate of the air conditioner and allows for calculation of a suitable maintenance contract fee based on the failure rate of the air conditioner.

In the maintenance contract fee calculation system, the setting information preferably includes information about at least one of a length of piping connecting the indoor unit to the outdoor unit, a difference in height between the indoor unit and the outdoor unit, and a quantity of the indoor unit and the outdoor unit connected in each system. This configuration includes preferable information on the setting of the air conditioner in the setting information and allows for calculation of a suitable maintenance contract fee based on the failure rate of the air conditioner.

In the maintenance contract fee calculation system, preferably, the acquisition unit further obtains operation information related to operation data on the air conditioner, and the calculation unit calculates the maintenance contract fee in accordance with the first environmental information, the second environmental information, and the operation information. This configuration calculates the maintenance contract fee in accordance with the first environmental information, the second environmental information, and the operation information associated with the failure rate of the air conditioner and allows for calculation of a suitable maintenance contract fee based on the failure rate of the air conditioner.

In the maintenance contract fee calculation system, the operation information preferably includes information about at least one of an operation time, a thermo-on time, a quantity of start-and-stops, and a maximum load during a predetermined period. This configuration includes preferable information related to operation data on the air conditioner in the operation information and allows for calculation of a suitable maintenance contract fee based on the failure rate of the air conditioner.

In the maintenance contract fee calculation system, preferably, the acquisition unit further obtains an operation period from a date when operation of the air conditioner started, and the calculation unit calculates the maintenance contract fee in accordance with the first environmental information, the second environmental information, and the operation period. This configuration calculates the maintenance contract fee in accordance with the first environmental information, the second environmental information, and the operation period associated with the failure rate of the air conditioner and allows for calculation of a suitable maintenance contract fee based on the failure rate of the air conditioner.

The maintenance contract fee calculation system preferably further includes a learning unit that uses supervisor data including a first failure rate of the indoor unit based on the installation environment of the indoor unit and a second failure rate of the outdoor unit based on the installation environment of the outdoor unit to generate a calculation model for calculating the maintenance contract fee in accordance with the first environmental information and the second environmental information, where the calculation unit calculates the maintenance contract fee in accordance with the first environmental information, the second environmental information, and the calculation model. This configuration calculates the maintenance contract fee in accordance with the first environmental information, the second environmental information, and the calculation model, which is generated using supervisor data, and allows for calculation of a suitable maintenance contract fee based on the failure rate of the air conditioner.

BRIEF DESCRIPTION OF THE DRAWINGS

FIG. 7 is a table of facility information.

FIG. 8 is a table of specific environmental information about indoor units and outdoor units.

MODES FOR CARRYING OUT THE INVENTION

Embodiment

A maintenance contract fee calculation system 1 according to one embodiment will now be described. It should be noted that the present disclosure is not limited to the examples described hereafter, but is intended to include any equivalence to the claims and any modification that is within the scope of the claims.

The maintenance contract fee calculation system 1 is used to conclude a maintenance contract for an air conditioning system 20 between, for example, a maintenance contract company and a client. The maintenance contract fee calculation system 1 calculates a maintenance contract fee for providing the client with services under the maintenance contract for the air conditioning system 20 during a preset contract term. The services of the maintenance contract for the air conditioning system 20 include maintenance, troubleshooting, and the like of the air conditioning system 20. The maintenance contract fee is renewed when, for example, the contract term is renewed. When the maintenance contract fee is paid monthly during the contract term, the maintenance contract fee may be renewed every month.

Figure 1:
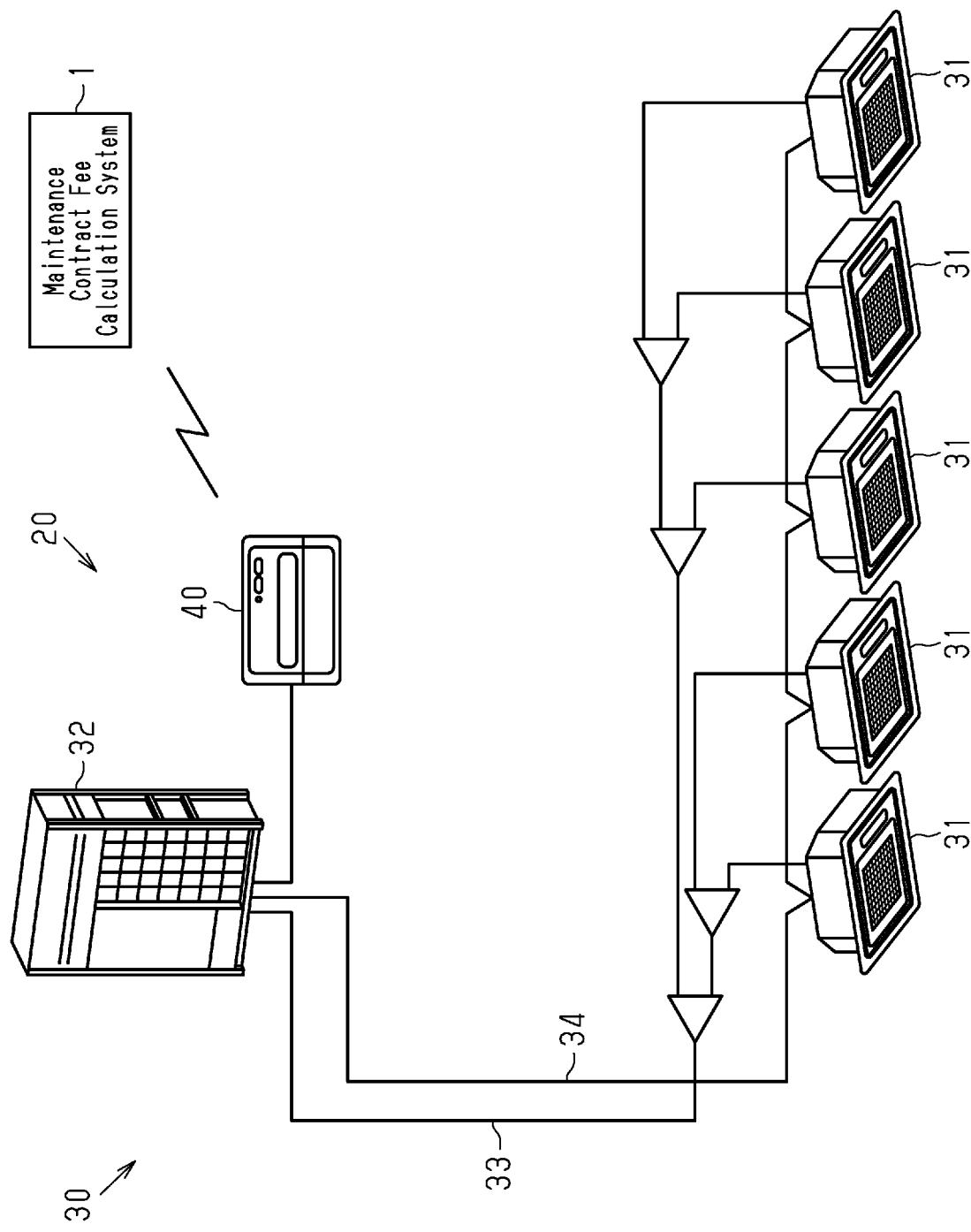
FIG. 1 is a schematic view illustrating the relationship between a maintenance contract fee calculation system and an air conditioning system.

As shown in FIG. 1, the air conditioning system 20 includes an air conditioner 30 and an air conditioning management device 40 that manages the air conditioner 30. The air conditioner 30 includes indoor units 31 and an outdoor unit 32. In an example shown in FIG. 1, five indoor units 31 and one outdoor unit 32 are connected in each system. The system may include one to four indoor units 31 or six indoor units 31 or more. The system may include two, three, four, or more outdoor units 32. The indoor units 31 are connected to the outdoor unit 32 by, for example, a refrigerant pipe 33 and an air conditioning communication line 34. The air conditioning management device 40 is connected to the outdoor unit 32 by the air conditioning communication line 34. The air conditioning management device 40 collectively manages the indoor units 31 in response to an instruction from, for example, an administrator of the facility in which the air conditioner 30 is installed. The air conditioning system 20 may be configured without the air conditioning management device 40.

Figure 2:
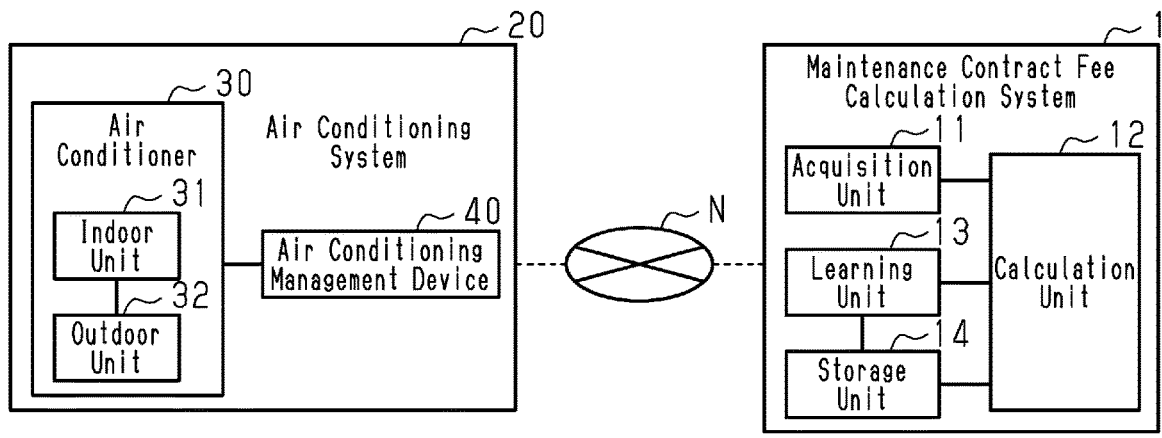
FIG. 2 is a block diagram of the maintenance contract fee calculation system and the air conditioning system.

The configuration of the maintenance contract fee calculation system 1 will now be described with reference to FIG. 2.

The maintenance contract fee calculation system 1 calculates a maintenance contract fee for the air conditioner 30 including the indoor units 31 and the outdoor unit 32. The maintenance contract fee calculation system 1 includes an acquisition unit 11 that obtains various types of information on the air conditioner 30 and a calculation unit 12 that calculates a maintenance contract fee in accordance with the various types of information on the air conditioner 30. The various types of information on the air conditioner 30 include first environmental information related to the installation environment of the indoor units 31 and second environmental information related to the installation environment of the outdoor unit 32. The various types of information on the air conditioner 30 may further include at least one of setting information related to the setting of the air conditioner 30, operation information related to operation data on the air conditioner 30, and operation information related to operation data on the air conditioner 30.

The maintenance contract fee calculation system 1 is configured to communicate with the air conditioning system 20 through a network N. In one example, the maintenance contract fee calculation system 1 is configured to communicate with the air conditioning management device 40 through the network N. The acquisition unit 11 obtains various types of information on the air conditioner 30 through, for example, the network N. The acquisition unit 11 may obtain various types of information on the air conditioner 30 directly from the air conditioning management device 40 or estimate various types of information on the air conditioner 30 based on information obtained from the air conditioning management device 40. The acquisition unit 11 may obtain various types of information on the air conditioner 30 from a server or a database based on information obtained from the air conditioning management device 40. In an example in which the air conditioning system 20 does not include the air conditioning management device 40, the acquisition unit 11 obtains various types of information on the air conditioner 30 from at least one of the indoor units 31 and the outdoor unit 32. When the maintenance contract fee calculation system 1 does not communicate with the air conditioning system 20 through the network N, the acquisition unit 11 obtains various types of information on the air conditioner 30 from inspection data taken when the air conditioner 30 is inspected.

The acquisition unit 11 obtains the first environmental information related to the installation environment of the indoor unit 31 and the second environmental information related to the installation environment of the outdoor unit 32. When each system includes multiple indoor units 31, the acquisition unit 11 may obtain the first environmental information related to the installation environment from a representative indoor unit 31 or obtain the first environmental information related to the installation environment from each indoor unit 31. The first environmental information includes information that affects the failure rate of the indoor units 31. The second environmental information includes information that affects the failure rate of the outdoor unit 32.

The acquisition unit 11 obtains, as the first environmental information, at least one of the location of the facility in which the indoor units 31 are installed, the purpose of the facility, the surrounding environment of the indoor unit 31, and the purpose of the spot in which each indoor unit 31 is installed. The location of the facility includes, for example, information about the address of the facility. When it can be expected from the location of the facility that the operation rate of the air conditioner 30 will be high, it can be expected that the air conditioner 30 will have an increased failure rate. The purpose of the facility includes information about any one of, for example, commercial establishment, factory, school, and residence. When it can be expected from the purpose of the facility that the operation rate of the air conditioner 30 will be high, it can be expected that the air conditioner 30 will have an increased failure rate. The surrounding environment of the indoor unit 31 includes information about at least one of, for example, oil, humidity, water droplets, and dust. It can be expected that the air conditioner 30 will have a higher failure rate as at least one of the amount of oil, the humidity, the amount of water droplets, and the amount of dust increases in the surrounding environment of the indoor unit 31. When obtaining the surrounding environment of the indoor units 31 as the first environmental information, the acquisition unit 11 may obtain the location of the facility in which the indoor units 31 are installed to obtain the surrounding environment of indoor units installed in other nearby facilities from a database or the like as the surrounding environment of the indoor units 31. The purpose of the spot in which the indoor units 31 are installed includes information about any one of a sports gym, a server room, a classroom, a kitchen, and the like. When it can be expected from the purpose of the spot in which the indoor units 31 are installed that the indoor units 31 will be greatly affected by outside factors, it can be expected that the air conditioner 30 will have an increased failure rate.

The acquisition unit 11 obtains, as the second environmental information, at least one of the location of the facility in which the outdoor unit 32 is installed, the purpose of the facility, the surrounding environment of the outdoor unit 32, and the purpose of the spot in which the outdoor unit 32 is installed. The surrounding environment of the outdoor unit 32 includes information about at least one of salt damage, sand, wind and rain, and snow. It can be expected that an increase in at least one of salt damage, sand, wind and rain, and snow in the surrounding environment of the outdoor unit 32 will increase the failure rate of the air conditioner 30. When obtaining the surrounding environment of the outdoor unit 32 as the second environmental information, the acquisition unit 11 may obtain the location of the facility in which the outdoor unit 32 is installed to obtain the surrounding environment of the outdoor unit 32 from a meteorological server or the like based on the location. The surrounding environment of the outdoor unit 32 may include information about living organisms that may enter the outdoor unit 32 in addition to or in place of the information about at least one of salt damage, sand, wind and rain, and snow. The purpose of the spot in which the outdoor unit 32 is installed includes information about any one of a parking lot, a playground, a yard, a roof, a balcony, or the like. When it can be expected from the purpose of the spot in which the outdoor unit 32 is installed that the outdoor unit 32 will be greatly affected by outside factors, it can be expected that the air conditioner 30 will have an increased failure rate.

The acquisition unit 11 further obtains setting information related to the setting of the air conditioner 30. The setting information includes information that affects the failure rate of the air conditioner 30. The setting information includes information about at least one of the length of piping connecting the indoor units 31 to the outdoor unit 32, the difference in height between the indoor unit 31 and the outdoor unit 32, and the quantity of the indoor units 31 and the outdoor units 32 connected in each system. The length of the piping connecting the indoor unit 31 and the outdoor unit 32 is, for example, the length of the refrigerant pipe 33. It can be expected that the air conditioner 30 will have a higher failure rate as the length of the piping connecting the indoor units 31 and the outdoor unit 32 increases. The difference in height between the indoor units 31 and the outdoor unit 32 is determined by, for example, the difference in height between the bottom surface of each indoor unit 31 and the bottom surface of the outdoor unit 32. It can be expected that the air conditioner 30 will have a higher failure rate as the difference in height between the indoor unit 31 and the outdoor unit 32 increases. The quantity of the indoor units 31 and the outdoor units 32 connected in each system is determined by, for example, the relationship between the quantity of the indoor units 31 and the quantity of the outdoor units 32 in each system. In one example, the quantity of the indoor units 31 and the outdoor units 32 connected in each system is the quantity of the indoor units 31 that are connected to the outdoor units 32. It can be expected that the air conditioner 30 will have a higher failure rate as the quantity of the indoor units 31 and the outdoor units 32 connected in each system increases.

The acquisition unit 11 further obtains operation information related to operation data on the air conditioner 30. The operation information includes information that affects the failure rate of the air conditioner 30. The operation information includes information about at least one of an operation time, a thermo-on time, the quantity of start-and-stops, and the maximum load during a predetermined period. The operation time during the predetermined period indicates a time during which the air conditioner 30 is in operation during the predetermined period. It is expected that the air conditioner 30 will have a higher failure rate as the operation time increases during the predetermined period. The operation time may be an operation time of each component in the air conditioner 30. The components of the air conditioner 30 include at least one of a component of the indoor unit 31 and a component of the outdoor unit 32. The thermo-on time during the predetermined period indicates the time during which the compressor of the air conditioner 30 is in operation during the predetermined period. It can be expected that the air conditioner 30 will have a higher failure rate as the thermo-on time during the predetermined period increases. The quantity of start-and-stops during the predetermined period indicates the quantity of operation starts and operation stops of the compressor repeated during a predetermined period. It can be expected that the air conditioner 30 will have a higher failure rate as the quantity of start-and-stops increases during the predetermined period. The maximum load during the predetermined period indicates the maximum load of the compressor during the predetermined period. It can be expected that the air conditioner 30 will have a higher failure rate as the maximum load increases during the predetermined period. The operation information may include cooling information about a cooling operation of the air conditioner 30 in addition to or in place of at least one of the operation time, the thermo-on time, the quantity of start-and-stops, and the maximum load during a predetermined period. The cooling state includes information about at least one of an initial cooling operation for cooling and the frequency of cooling operations.

The acquisition unit 11 further obtains an operation period from the date when the operation of the air conditioner 30 started. The operation start date of the air conditioner 30 is, for example, the day when the air conditioner 30 was installed. The operation period includes information that affects the failure rate of the air conditioner 30. It can be expected that the air conditioner 30 will have a higher failure rate as the operation period of the air conditioner 30 increases. The acquisition unit 11 may obtain the operation period of the indoor units 31 or the outdoor unit 32 or obtain the operation period of each of the indoor units 31 and the operation period of the outdoor unit 32. When each system includes multiple indoor units 31, the acquisition unit 11 may obtain the operation period from a representative one of the indoor units 31 or the outdoor unit 32 or obtain the operation period from each indoor unit 31 and outdoor unit 32. When at least one of the indoor units 31 and the outdoor unit 32 is replaced by a new one, the operation period is renewed as that of the new device.

The maintenance contract fee calculation system 1 further includes a learning unit 13 that uses supervisor data including various types of information on the air conditioner 30 to generate a calculation model for calculating the maintenance contract fee from the various types of information on the air conditioner 30. The supervisor data includes a first failure rate of the indoor units 31 based on the installation environment of the indoor units 31 and a second failure rate of the outdoor unit 32 based on the installation environment of the outdoor unit 32. The learning unit 13 generates the calculation model from the first environmental information and the second environmental information. The supervisor data may further include at least one of a third failure rate based on the setting of the air conditioner 30, a fourth failure rate based on the operation data on the air conditioner 30, and a fifth failure rate based on the operation period of the air conditioner 30. In this case, the learning unit 13 generates the calculation model from the first environmental information, the second environmental information, and at least one of the setting information, the operation information, and the operation period. The maintenance contract fee calculation system 1 may be configured without the learning unit 13.

The maintenance contract fee calculation system 1 further includes a storage unit 14 that stores various types of information associated with the calculation of a maintenance contract fee. The storage unit 14 stores, for example, at least one of the supervisor data and the calculation model in a renewable manner. In an example in which the maintenance contract fee calculation system 1 does not include the learning unit 13, the storage unit 14 may store a renewable model that is preset to calculate the maintenance contract fee from various types of information on the air conditioner 30.

The calculation unit 12 calculates a maintenance contract fee in accordance with the first environmental information and the second environmental information. The calculation unit 12 calculates a lower maintenance contract fee when it is expected from, for example, the first environmental information and the second environmental information that the air conditioner 30 will have a low failure rate. The calculation unit 12 calculates a higher maintenance contract fee when it is expected from, for example, the first environmental information and the second environmental information that the air conditioner 30 will have a higher failure rate.

The calculation unit 12 calculates the maintenance contract fee in accordance with, for example, any one of first to fifth examples. In the first example, the calculation unit 12 calculates the maintenance contract fee in accordance with the first environmental information and the second environmental information. In the second example, the calculation unit 12 calculates the maintenance contract fee in accordance with the first environmental information, the second environmental information, and the setting information. In the third example, the calculation unit 12 calculates the maintenance contract fee in accordance with the first environmental information, the second environmental information, and the operation information. In the fourth example, the calculation unit 12 calculates the maintenance contract fee in accordance with the first environmental information, the second environmental information, and the operation period. In the fifth example, the calculation unit 12 calculates the maintenance contract fee in accordance with the calculation model and various types of information used to generate the calculation model. In one example, the calculation unit 12 calculates the maintenance contract fee in accordance with the first environmental information, the second environmental information, and the calculation model. In the present embodiment, the calculation unit 12 uses the fifth example to calculate the maintenance contract fee. The acquisition unit 11 may obtain only information used to calculate the maintenance contract fee.

Figure 3:
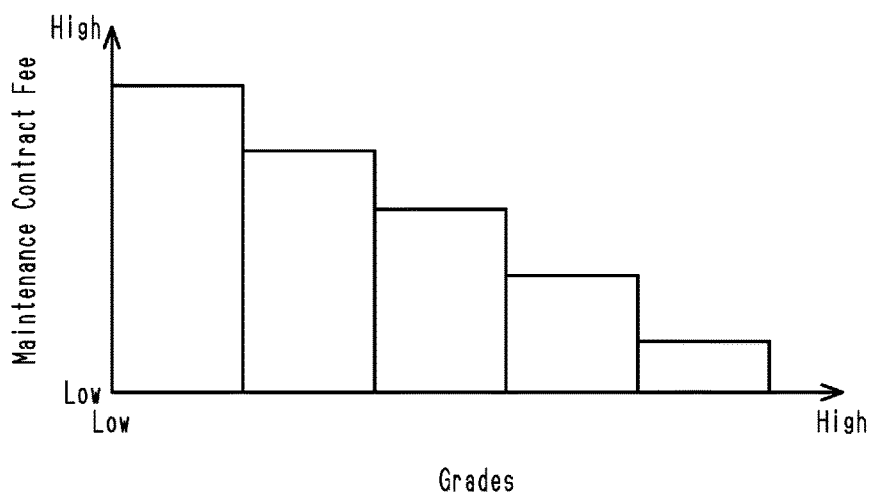
FIG. 3 is a graph illustrating one example of the relationship between maintenance contract fees and grades.

The relationship between maintenance contract fees and grades will now be described with reference to FIG. 3.

The calculation unit 12 determines a grade that is specified by a fee structure of maintenance contract fee using various types of information on the air conditioner 30 and calculates a maintenance contract fee based on the grade. In this case, the maintenance contract fee varies in steps based on grade. The calculation unit 12 determines the grade so that the maintenance contract fee is lower if, for example, the air conditioner 30 has a low failure rate or it can be expected that the air conditioner 30 will have a low failure rate. In an example shown in FIG. 3, the maintenance contract fee becomes lower as the grade becomes higher. The calculation unit 12 determines the grade so that the maintenance contract fee is higher if, for example, the air conditioner 30 has a high failure rate or it can be expected that the air conditioner 30 will have a high failure rate. In the example shown in FIG. 3, the maintenance contract fee becomes higher as the grade becomes lower. The calculation unit 12 may calculate the maintenance contract fee separately for each type of information on the air conditioner 30.

An example of a process executed by the maintenance contract fee calculation system 1 will now be described with reference to FIG. 4.

In step S11, the maintenance contract fee calculation system 1 obtains various types of information on the air conditioner 30. In one example, the acquisition unit 11 obtains various types of information used to calculate a maintenance contract fee through the network N. In step S12, the maintenance contract fee calculation system 1 generates a calculation model for calculating the maintenance contract fee. In one example, the learning unit 13 generates the calculation model from the first environmental information and the second environmental information. The learning unit 13 may save information about the calculation model in the storage unit 14 and output the information about the calculation model to the calculation unit 12. In step S13, the maintenance contract fee calculation system 1 calculates the maintenance contract fee in accordance with the various types of information on the air conditioner 30. In one example, the calculation unit 12 calculates the maintenance contract fee in accordance with the first environmental information, the second environmental information, and the calculation model. This ends the process of steps S11 to S13.

A series of processes related to a maintenance contract between a maintenance contract company and a client will now be described with reference to FIG. 5.

A maintenance contract between a maintenance contract company and a client is concluded, for example, in accordance with the following procedure. In step S21, the client sends a request to the maintenance contract company to enter a maintenance contract. In step S22, the maintenance contract company determines whether to approve the request and enter a maintenance contract and then notifies the client of whether the request is approved. For example, the maintenance contract company allows the client to enter a maintenance contract when the client satisfies the conditions of the maintenance contract. The maintenance contract company rejects the request to enter a maintenance contract when the client does not satisfy the conditions of the maintenance contract. When the request to enter a maintenance contract is approved, the process proceeds to step S23. When the request to enter a maintenance contract is rejected, a maintenance contract is not concluded between the maintenance contract company and the client.

In step S23, the client transmits various types of information used to calculate the maintenance contract fee to the maintenance contract company. Specifically, the air conditioning system 20 owned by the client transmits various types of information, used to calculate a maintenance contract fee, to the maintenance contract fee calculation system 1 of the maintenance contract company. In step S24, the maintenance contract fee calculation system 1 calculates the maintenance contract fee in accordance with the various types of information on the air conditioner 30. In step S25, the maintenance contract company transmits data on the maintenance contract fee to the client. In step S26, the client pays the maintenance contract fee to the maintenance contract company. This concludes the maintenance contract between the maintenance contract company and the client. The maintenance contract between the maintenance contract company and the client can separately cover the air conditioning system 20, the air conditioner 30, the indoor units 31, the outdoor unit 32, the components of the indoor units 31, and the components of the outdoor unit 32.

Figure 5:
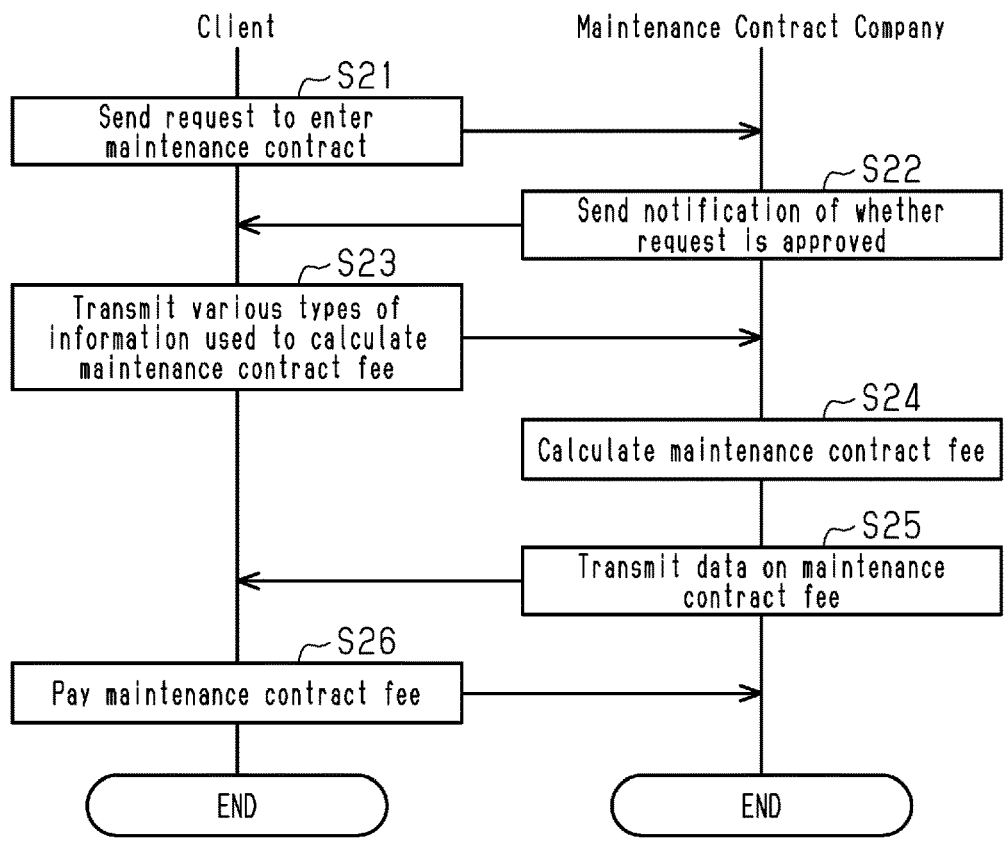
FIG. 5 is a flowchart showing a series of processes related to a maintenance contract between a maintenance contract company and a client.

When the contract term of the maintenance contract expires, the maintenance contract between the maintenance contract company and the client may be renewed through a procedure that is substantially the same as that shown in FIG. 5. Specifically, the maintenance contract between the maintenance contract company and the client is renewed through the procedure of step S23 to step S26 when the client requests for renewal of the contract term to the maintenance contract company and the maintenance contract company agrees to renew the maintenance contract. The maintenance contract between the maintenance contract company and the client may be automatically renewed when the contract term of the maintenance contract expires.

The present embodiment has the following advantages.

(1) The maintenance contract fee calculation system 1 calculates a maintenance contract fee in accordance with the first environmental information and the second environmental information. This configuration calculates the maintenance contract fee in accordance with the installation environment of the indoor units 31 and the installation environment of the outdoor unit 32. Thus, a suitable maintenance contract fee can be calculated in accordance with the failure rate of the air conditioner 30. This allows services to be provided to the client, who enters a maintenance contract, in a preferred manner.

(2) The acquisition unit 11 obtains, as the first environmental information, at least one of the location of the facility in which the indoor units 31 are installed, the purpose of the facility, the surrounding environment of the indoor units 31, and the purpose of the spot in which the indoor units 31 are installed. This configuration includes preferable information on the installation environment of the indoor units 31 in the first environmental information and allows for calculation of a suitable maintenance contract fee based on the failure rate of the air conditioner 30.

(3) The surrounding environment of the indoor unit 31 includes information about at least one of, for example, oil, humidity, water droplets, and dust. This configuration includes preferable information about the surrounding environment of the indoor unit 31 in the first environmental information and allows for calculation of a suitable maintenance contract fee based on the failure rate of the air conditioner 30.

(4) The acquisition unit 11 obtains, as the second environmental information, at least one of the location of the facility in which the outdoor unit 32 is installed, the purpose of the facility, the surrounding environment of the outdoor unit 32, and the purpose of the spot in which the outdoor unit 32 is installed. This configuration includes preferable information about the installation environment of the outdoor unit 32 in the second environmental information and allows for calculation of a suitable maintenance contract fee based on the failure rate of the air conditioner 30.

(5) The surrounding environment of the outdoor unit 32 includes information about at least one of salt damage, sand, wind and rain, and snow. This configuration includes preferable information about the surrounding environment of the outdoor unit 32 in the second environmental information and allows for calculation of a suitable maintenance contract fee based on the failure rate of the air conditioner 30.

(6) The calculation unit 12 calculates a maintenance contract fee in accordance with the first environmental information, the second environmental information, and the setting information. This configuration calculates the maintenance contract fee in accordance with the first environmental information, the second environmental information, and the setting information associated with the failure rate of the air conditioner 30 and allows for calculation of a suitable maintenance contract fee based on the failure rate of the air conditioner 30.

(7) The setting information includes information about at least one of the length of the piping connecting the indoor unit 31 to the outdoor unit 32, the difference in height between the indoor unit 31 and the outdoor unit 32, and the quantity of the indoor units 31 and the outdoor units 32 connected in each system. This configuration includes preferable information on the setting of the air conditioner 30 in the setting information and allows for calculation of a suitable maintenance contract fee based on the failure rate of the air conditioner 30.

(8) The calculation unit 12 calculates a maintenance contract fee in accordance with the first environmental information, the second environmental information, and the operation information. This configuration calculates the maintenance contract fee in accordance with the first environmental information, the second environmental information, and the operation information associated with the failure rate of the air conditioner 30 and allows for calculation of a suitable maintenance contract fee based on the failure rate of the air conditioner 30.

(9) The operation information includes information about at least one of an operation time, a thermo-on time, the quantity of start-and-stops, and the maximum load during a predetermined period. This configuration includes preferable information related to operation data on the air conditioner 30 in the operation information and allows for calculation of a suitable maintenance contract fee based on the failure rate of the air conditioner 30.

(10) The calculation unit 12 calculates a maintenance contract fee in accordance with the first environmental information, the second environmental information, and the operation period. This configuration calculates the maintenance contract fee in accordance with the first environmental information, the second environmental information, and the operation period associated with the failure rate of the air conditioner 30 and allows for calculation of a suitable maintenance contract fee based on the failure rate of the air conditioner 30.

(11) The calculation unit 12 calculates a maintenance contract fee in accordance with the first environmental information, the second environmental information, and the calculation model. This configuration calculates the maintenance contract fee in accordance with the first environmental information, the second environmental information, and the calculation model, which is generated using supervisor data, and allows for calculation of a suitable maintenance contract fee based on the failure rate of the air conditioner 30.

Other Embodiments

The following embodiments are an example of forms that the maintenance contract fee calculation system according to the present disclosure can take and are not intended to limit the forms. The maintenance contract fee calculation system according to the present disclosure can take a different form from that described in the above embodiment. Examples include a form in which part of the configuration of the above embodiment is replaced, modified, or removed and a form in which a new configuration is added to the above embodiment. In the following modifications, similar or the same reference numerals are given to those components that are the same as the corresponding components in the above embodiment. Such components will not be described.

The method for calculating a maintenance contract fee may be modified. The calculation unit 12 calculates a maintenance contract fee in any one of sixth to fourteenth examples. In the sixth example, the acquisition unit 11 further obtains weather information related to the weather. The calculation unit 12 calculates the maintenance contract fee in accordance with the first environmental information, the second environmental information, and the weather information. When it can be expected from the weather that the air conditioner 30 will have a high operation rate, it can be expected that the air conditioner 30 will have a high failure rate. In the seventh example, the acquisition unit 11 further obtains management information about whether the air conditioning management device 40 is available. The calculation unit 12 calculates a maintenance contract fee in accordance with the first environmental information, the second environmental information, and the management information. When collective management is not performed by the air conditioning management device 40, it can be expected that the air conditioner 30 will have a higher failure rate. In the eighth example, the acquisition unit 11 further obtains inspection information about whether regular inspections have been conducted. The calculation unit 12 calculates a maintenance contract fee in accordance with the first environmental information, the second environmental information, and the inspection information. When regular inspections are not conducted, it can be expected that the air conditioner 30 will have a higher failure rate. In the ninth example, the acquisition unit 11 further obtains term information on the term of the maintenance contract between the maintenance contract company and the client. The calculation unit 12 calculates the maintenance contract fee in accordance with the first environmental information, the second environmental information, and the term information.

In the tenth example, the acquisition unit 11 further obtains deterioration information about deterioration of components of the air conditioner 30. The calculation unit 12 calculates the maintenance contract fee in accordance with the first environmental information, the second environmental information, and the deterioration information. It can be expected that the air conditioner 30 will have a higher failure rate as the deterioration of the components of the air conditioner 30 increases. In the eleventh example, the acquisition unit 11 further obtains operation change information about changes in the operation state of the air conditioner 30. The operation change information includes at least one of how the air conditioner 30 is used and an operation schedule of the air conditioner 30. The calculation unit 12 calculates the maintenance contract fee in accordance with the first environmental information, the second environmental information, and the operation change information. In the twelfth example, the acquisition unit 11 further obtains a declared value related to the operation data on the air conditioner 30. The declared value differs from the actual operation data on the air conditioner 30. The calculation unit 12 calculates the maintenance contract fee in accordance with the first environmental information, the second environmental information, and the declared value. In the thirteenth example, the acquisition unit 11 further obtains various types of information about air conditioners installed in another facility (hereafter referred to as other facility information). The other facility differs from the facility in which the air conditioner 30 is installed. The calculation unit 12 calculates the maintenance contract fee in accordance with the first environmental information, the second environmental information, and the other facility information. In the fourteenth example, the calculation unit 12 calculates the maintenance contract fee in accordance with the first environmental information, the second environmental information, and at least two of the setting information, the operation information, the operation period, the weather information, the management information, the inspection information, the term information, the deterioration information, the operation change information, the declared value, and the other facility information.

Figure 4:
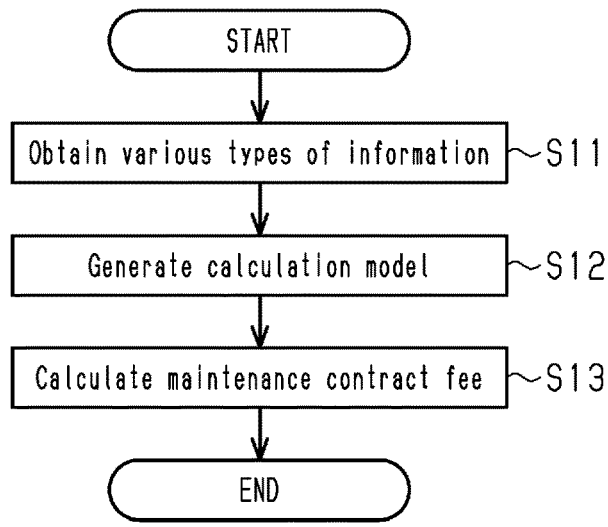
FIG. 4 is a flowchart showing an example of a process executed by the maintenance contract fee calculation system.

In the embodiment shown in FIG. 4, the maintenance contract fee calculation system 1 generates a calculation model for calculating the maintenance contract fee. Instead, a calculation model may be generated in advance. A calculation model may be a trained model obtained by learning supervisor data collected through a network from other air conditioners. The supervisor data includes at least first environmental information, second environmental information, an operation period, and a failure rate. The trained model calculates the failure rate of a specified period based on the first environmental information and the second environmental information to calculate a maintenance contract fee based on the failure rate. The calculation model may be a calculation program designed based on logic and past data. The calculation program is configured by mathematical expressions, flowcharts including branches, decision tree analysis, or a combination of these elements. The calculation program does not require learning from supervisor data and there is no need to collect supervisor data.

The maintenance contract fee calculation system 1 is not limited to the example of the system in the above embodiment but may be configured to have various forms. The forms of the maintenance contract fee calculation system 1 will now be described in the following. The example system described below outputs a calculated maintenance contract fee. The maintenance contract fee calculation system 1 described below in other embodiments will be referred to as a maintenance contract fee output system 2.

Figure 6:
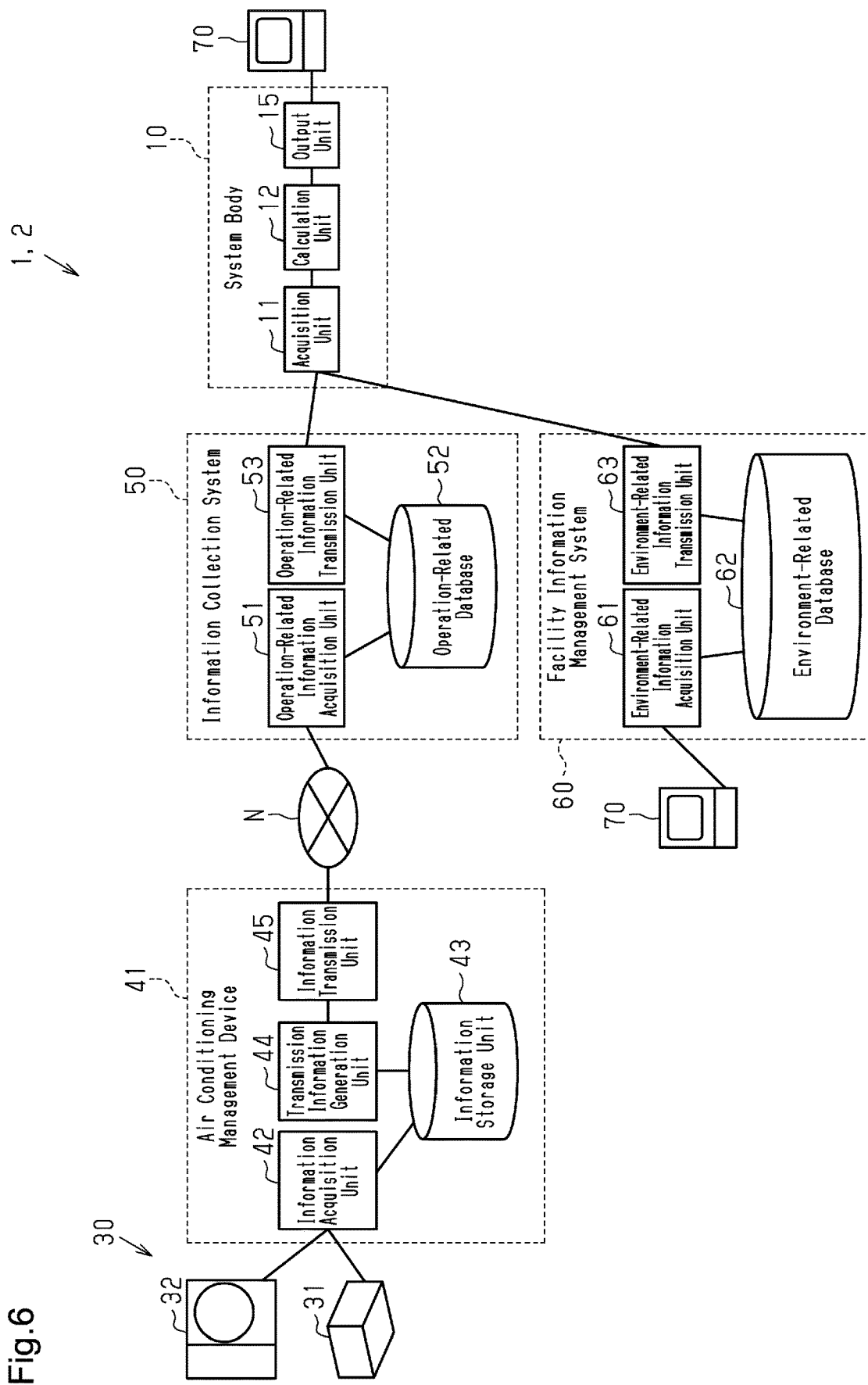
FIG. 6 is a schematic view illustrating the relationship between a maintenance contract fee calculation system and an air conditioner according to another embodiment.

The maintenance contract fee output system 2 will be described with reference to FIGS. 6, 7, and 8. FIG. 6 is a schematic view illustrating the relationship between the maintenance contract fee output system 2 and the air conditioner 30. FIG. 7 is an example of a table of facility information indicating facilities in which air conditioners 30 are installed. FIG. 8 is an example of a table of specific environmental information about indoor units 31 and outdoor units 32 of air conditioners 30. The facility information is environmental information about a facility shared by an indoor unit 31 and an outdoor unit 32. The specific environmental information is environmental information related to each of the indoor unit 31 and the outdoor unit 32. The facility information includes the location of the facility in which the air conditioner 30 is installed and the purpose of the facility. The specific environmental information about the indoor unit 31 is related to the surrounding environment of the indoor unit 31 (such as an oil component) and the purpose of the spot in which the indoor unit 31 is installed (such as a sports gym). The specific environmental information about the outdoor unit 32 is related to the surrounding environment of the outdoor unit 32 (such as salt damage) and the purpose of the spot in which the outdoor unit 32 is installed (such as a rooftop).

The maintenance contract fee output system 2 in the present embodiment calculates the maintenance contract fee for the air conditioner 30 including the indoor unit 31 and the outdoor unit 32 and outputs the calculated maintenance contract fee. The output may be performed in any manner. The maintenance contract fee output system 2 may output the maintenance contract fee as data or on a paper medium. There is no limit to the output destination of the maintenance contract fee output system 2. For example, the maintenance contract fee output system 2 may send an output to a terminal that is connected directly to the maintenance contract fee output system 2 or a terminal 70 that is temporarily connected via the network N.

As shown in FIG. 6, the maintenance contract fee output system 2 includes at least the acquisition unit 11, the calculation unit 12, and an output unit 15. The acquisition unit 11, the calculation unit 12, and the output unit 15 are components of a system body 10 of the maintenance contract fee output system 2. The maintenance contract fee output system 2 further includes an air conditioning management device 41, an information collection system 50, and a facility information management system 60.

The air conditioning management device 41 has the collective management functionality of the air conditioning management device 40 in the above embodiment and a functionality for transmitting information used to calculate a maintenance contract fee. Preferably, the air conditioning management device 41 is installed in the same facility as the air conditioner 30.

The air conditioning management device 41 includes an information acquisition unit 42, an information storage unit 43, a transmission information generation unit 44, and an information transmission unit 45.

The information acquisition unit 42 obtains operation information transmitted from indoor unit 31 and the outdoor unit 32. The operation information is the data transmitted from the indoor unit 31 and the outdoor unit 32. The operation information includes information other than the operation information used to calculate the maintenance contract fee. For example, information other than the operation information used to calculate a maintenance contract fee includes information used to analyze failures, information about energy consumption, information used for maintenance, and information about operation history. Such operation information may be classified into any one of or more than one of the operation information used to calculate the maintenance contract fee, the information used to analyze failures, the information about energy consumption, the information used for maintenance, and the information about operation history. For example, the quantity of start-and-stops can be the operation information used to calculate a maintenance contract fee, the information used to analyze failures, and the information used for maintenance.

The information storage unit 43 stores information obtained by the information acquisition unit 42. The information storage unit 43 stores operation information used to calculate a maintenance contract fee and information other than operation information used to calculate a maintenance contract fee.

The transmission information generation unit 44 generates transmission information including operation information transmitted by the information transmission unit 45. The transmission information generation unit 44 generates transmission information in accordance with transmission conditions. The transmission conditions specify operation information used to calculate the maintenance contract fee from various types of operation information. For example, the transmission conditions specify the operation time, the thermo-on time, the quantity of start-and-stops, and the maximum load during the predetermined period from various types of operation information. Thus, the transmission information includes operation information used to calculate the maintenance contract fee during the predetermined period and does not include unnecessary information. The transmission information includes device identification information about the indoor unit 31 (hereafter referred to as device ID of indoor unit 31) and device identification information about the outdoor unit 32 (hereafter referred to as device ID of outdoor unit 32). The transmission information includes information related to a predetermined period. For example, the transmission information includes when a predetermined period starts (date and time) and ends (date and time). The transmission information generation unit 44 sets the predetermined period whenever generating transmission information. The predetermined period may be a period from when the air conditioner 30 was installed to when the transmission information is generated (hereafter referred to as entire period). The predetermined period may be a period from when the transmission information is generated to a set point in time in the past (hereafter referred to as partial period). When the predetermined period is a partial period, which is part of the entire period, it is preferred that the transmission information be generated in partial period cycles. This reduces the amount of information stored in the information storage unit 43.

The transmission information generation unit 44 associates the operation information specified for the indoor unit 31 with the device ID of the indoor unit 31 to generate first information including the associated information. The transmission information generation unit 44 associates the operation information specified for the outdoor unit 32 with the device ID of the outdoor unit 32 to generate second information including the associated information. The transmission information generation unit 44 further generates facility association information that associates facility identification information (hereafter referred to as facility ID) about a facility in which the air conditioner 30 is installed with the first information and the second information. The transmission information generation unit 44 generates transmission information including the first information, the second information, and the facility association information.

The information transmission unit 45 transmits operation information about the indoor unit 31 and the outdoor unit 32 to the information collection system 50. Specifically, the information transmission unit 45 transmits the transmission information generated by the transmission information generation unit 44 to the information collection system 50.

The information collection system 50 obtains and holds the operation information about the indoor unit 31 and the operation information about the outdoor unit 32 from the air conditioning management device 41. The information collection system 50 is installed at a location separated from the air conditioning management device 41. The information collection system 50 is connected to the air conditioning management device 41 via the network N. The information collection system 50 is formed by a computer.

The information collection system 50 includes an operation-related information acquisition unit 51 that obtains operation information about the indoor unit 31 and the outdoor unit 32, an operation-related database 52 that stores information obtained by the operation-related information acquisition unit 51, and an operation-related information transmission unit 53 that transmits operation information to the acquisition unit 11.

The operation-related information acquisition unit 51 obtains transmission information transmitted by the air conditioning management device 41. The transmission information includes the operation information about the indoor unit 31 and the outdoor unit 32. Various types of information included in the transmission information are stored in the operation-related database 52. Specifically, the facility ID, the device ID of the outdoor unit 32, the device ID of the indoor unit 31, the operation information about the indoor unit 31, and the operation information about the outdoor unit 32 are associated with one another and stored in the operation-related database 52.

The operation-related information transmission unit 53 transmits operation information used to calculate the maintenance contract fee to the acquisition unit 11 in response to a request from the acquisition unit 11. The request from the acquisition unit 11 includes the facility ID related to the calculation of the maintenance contract fee.

The facility information management system 60 includes an environment-related information acquisition unit 61 that obtains the first environmental information and the second environmental information, an environment-related database 62 that stores the first environmental information and the second environmental information, and an environment-related information transmission unit 63 that transmits the first environmental information and the second environmental information to the acquisition unit 11.

The environment-related information acquisition unit 61 obtains the first environmental information and the second environmental information from a terminal 70 through an input operation performed by a person installing the air conditioner 30 in a facility. The environment-related information acquisition unit 61 stores the first environmental information and the second environmental information in the environment-related database 62. The first environmental information and the second environmental information may be renewed by a person who performs maintenance on the air conditioner 30.

In the environment-related database 62, the first environmental information is associated with the device ID of the indoor unit 31 related to the first environmental information and the facility ID of a facility in which the indoor unit 31 is installed. In the environment-related database 62, the second environmental information is associated with the device ID of the outdoor unit 32 related to the second environmental information and the facility ID of a facility in which the outdoor unit 32 is installed.

The environment-related database 62 associates and stores the facility ID, facility information about the information about the facility in which the air conditioner 30 is installed, information about the air conditioner 30 installed in the facility, device identification information (device IDs) that identifies the indoor unit 31 and the outdoor unit 32 of the air conditioner 30, the first environmental information, and the second environmental information. In the present embodiment, the environment-related database 62 stores the facility ID, identification information about the air conditioner 30 (hereafter referred to as air conditioner ID), the device ID of the indoor unit 31, and the device ID of the outdoor unit 32. In one example, the environment-related database 62 includes a first database such as that shown in the table of FIG. 7 and a second database such as than shown in the table of FIG. 8.

As shown in FIG. 7, the facility ID is associated with the air conditioner ID and the facility information. As shown in FIG. 8, the air conditioner ID is associated with the device ID of the indoor unit 31 and the device ID of the outdoor unit 32 (refer to FIG. 7). Further, the device ID of the indoor unit 31 is associated with the first environmental information. The device ID of the outdoor unit 32 is associated with the second environmental information.

The acquisition unit 11 of the system body 10 is configured to obtain the first environmental information on the installation environment of the indoor unit 31 and the second environmental information on the installation environment of the outdoor unit 32. Preferably, the acquisition unit 11 obtains the operation information about the indoor unit 31 and the outdoor unit 32 in the same manner as the present embodiment.

Specifically, with respect to the facility designated as the subject for calculation of the maintenance contract fee, the acquisition unit 11 obtains the operation information about the outdoor unit 32 and the operation information about the indoor unit 31 installed in the facility from the information collection system 50 as information used to calculate the maintenance contract fee.

Further, with respect to the facility designated as the subject for calculation of the maintenance contract fee, the acquisition unit 11 obtains the first environmental information about the indoor unit 31 and the second environmental information about the outdoor unit 32 associated with the facility from the facility information management system 60.

The calculation unit 12 is configured to calculate the maintenance contract fee in accordance with the first environmental information and the second environmental information. The method for calculating the maintenance contract fee may use a calculation model or a calculation program. The calculation unit 12 calculates the maintenance contract fee in accordance with the operation information about the indoor unit 31 and the outdoor unit 32, the first environmental information, and the second environmental information.

The output unit 15 outputs the calculated maintenance contract fee. The output unit 15 outputs the maintenance contract fee to the terminal 70 that is connected directly or via the network N. Examples of the network N include the Internet, a telephone line network, a local network, and the like. The output unit 15 outputs the maintenance contract fee for the air conditioner 30, which is specified by the terminal 70, to the terminal 70.

Examples of the maintenance contract fee output system 2 disclose the following techniques.

Embodiment 1

A maintenance contract fee output system 2 that calculates a maintenance contract fee for an air conditioner 30 including an indoor unit 31 and an outdoor unit 32 and outputs the calculated maintenance contract fee, the maintenance contract fee output system 2 including an acquisition unit 11, a calculation unit 12, and an output unit 15, in which the acquisition unit 11 is configured to obtain first environmental information about an installation environment of the indoor unit 31 and second environmental information about an installation environment of the outdoor unit 32, the calculation unit 12 is configured to calculate the maintenance contract fee in accordance with the first environmental information and the second environmental information, and the output unit 15 outputs the calculated maintenance contract fee.

With this configuration, the acquisition unit 11 obtains the first environmental information and the second environmental information as information used to calculate the maintenance contract fee, the calculation unit 12 calculates the maintenance contract fee, and the output unit 15 outputs the maintenance contract fee. This promptly presents the maintenance contract fee.

Embodiment 2

The maintenance contract fee output system 2 according to embodiment 1, further including a facility information management system 60, in which the facility information management system 60 further includes an environment-related database 62 that stores the first environmental information and the second environmental information and an environment-related information transmission unit 63 that transmits the first environmental information and the second environmental information to the acquisition unit 11.

With this configuration, the first environmental information and the second environmental information are gathered in the environment-related database 62. The environment-related information transmission unit 63 transmits the first environmental information and the second environmental information to the acquisition unit 11. This allows the acquisition unit 11 to easily obtain the first environmental information and the second environmental information.

Embodiment 3

The maintenance contract fee output system 2 according to embodiment 2, in which the environment-related database 62 stores facility information that is information about a facility in which the air conditioner 30 is installed, device identification information that identifies the indoor unit 31 and the outdoor unit 32 of the air conditioner 30, and associates and stores the first environmental information and the second environmental information.

With this configuration, the acquisition unit 11 easily obtains the first environmental information about the indoor unit 31 and the second environmental information about the outdoor unit 32 based on the device identification information about the indoor unit 31 and the device identification information about the outdoor unit 32.

Embodiment 4

The maintenance contract fee output system 2 according to any one of embodiments 1 to 3, further including an information collection system 50, in which the information collection system 50 includes an operation-related information acquisition unit 51 that obtains operation information about the indoor unit 31 and the outdoor unit 32, an operation-related database 52 that stores information obtained by the operation-related information acquisition unit 51, and an operation-related information transmission unit 53 that transmits the operation information to the acquisition unit 11. With this configuration, the acquisition unit 11 promptly obtains operation-related information.

Embodiment 5

The maintenance contract fee output system 2 according to embodiment 4, in which the acquisition unit 11 obtains the operation information about the indoor unit 31 and the outdoor unit 32 from the information collection system 50, and the calculation unit 12 calculates the maintenance contract fee in accordance with the operation information about the indoor unit 31 and the outdoor unit 32, the first environmental information, and the second environmental information. With this configuration, the operation information is used to calculate the maintenance contract fee so that the maintenance contract fee is calculated further efficiently.

Embodiment 6

The maintenance contract fee output system 2 according to embodiment 4 or 5, further including an air conditioning management device 41, in which the air conditioning management device 41 includes an information acquisition unit 42 that obtains operation information transmitted from each of the indoor unit 31 and the outdoor unit 32, an information transmission unit 45 that transmits the operation information about the indoor unit 31 and the outdoor unit 32 to the information collection system 50, and a transmission information generation unit 44 that generates transmission information which is the operation information transmitted by the information transmission unit 45. With this configuration, the operation information is processed into the transmission information so that the operation information can be transmitted to a remote device.

Embodiment 7

The maintenance contract fee output system 2 according to embodiment 6, in which the transmission information generation unit 44 generates the transmission information in accordance with a transmission condition that specifies operation information used to calculate the maintenance contract fee. With this configuration, the transmission information does not include information that is unnecessary for the calculation of the maintenance contract fee. This reduces the amount of transmission information transmitted by the transmission information generation unit 44.

In the description hereafter, the maintenance contract fee calculation system 1 will be referred to as the present system. The present system includes the maintenance contract fee calculation system 1 and the maintenance contract fee output system 2 described and illustrated in the above embodiment.

In the present system, the indoor unit 31 does not need to be installed indoors. The indoor unit 31 may be any device that air-conditions the air of an area including space subject to air conditioning (hereafter referred to as air conditioning subject space). There is no limitation to where the indoor unit 31 is installed. For example, the indoor unit 31 may be installed outdoors. The outdoor unit 32 may be any device that regulates the temperature of a refrigerant sent from the indoor unit 31. The outdoor unit 32 does not need to be installed outdoors. Instead, the outdoor unit 32 may be installed indoors.

The technique of the present system can be applied to various types of air conditioners. For example, the technique can be applied to an air conditioner that integrally includes an indoor unit and an outdoor unit. A specific example will now be described below.

An air conditioner of a type integrating an indoor unit and an outdoor unit is installed outdoors. The air conditioner includes a first heat exchanger, a second heat exchanger, a compressor, and a refrigerant circuit having an expansion valve. The refrigerant circuit is packaged as a single device. The air conditioner air-conditions the air conditioning subject space. The air conditioner includes an outlet port that discharges heat-exchanged air and an inlet port that draws in air. Air discharged from the outlet port is sent to the air conditioning subject space through a pipe. The first heat exchanger exchanges heat between the refrigerant and the air of the air conditioning subject space. The second heat exchanger exchanges heat between outdoor air and the refrigerant.

In the air conditioner of the type integrating the indoor unit and the outdoor unit, the first environmental information includes at least one of the location of a facility in which the air conditioner is installed, the purpose of the facility, the surrounding environment of the air conditioning subject space, and the purpose of the spot (room or site) including the air conditioning subject space. The surrounding environment of the air conditioning subject space includes information about at least one of oil, humidity, water droplets, and dust. The purpose of the spot (room or site) including the air conditioning subject space includes information about any one of a sports gym, a server room, a classroom, a kitchen, and the like. The second environmental information includes at least one of the location of the facility in which the air conditioner is installed, the purpose of the facility, the surrounding environment of the air conditioner, and the purpose of the spot in which the air conditioner is installed.

Examples of the air conditioner that integrally includes the indoor unit and the outdoor unit disclose the following techniques.

Embodiment 11

A maintenance contract fee calculation system 1 that calculates a maintenance contract fee for an air conditioner 30, the maintenance contract fee calculation system 1 including an acquisition unit 11 and a calculation unit 12, in which the acquisition unit 11 is configured to obtain first environmental information related to an air conditioning subject space of the air conditioner 30 and second environmental information related to an installation environment of the air conditioner, and the calculation unit 12 is configured to calculate the maintenance contract fee in accordance with the first environmental information and the second environmental information.

Examples of applications of the technique related to the present system will now be described. For example, the present system can be applied to an air conditioner that includes a chiller.

The air conditioner includes a chiller and an indoor unit. A refrigerant circuit includes the chiller and the indoor unit. The chiller may be installed indoors or outdoors. The chiller may be an air-cooled chiller or a water-cooled chiller.

In such an air conditioner, the first environmental information includes at least one of the location of a facility in which the indoor unit is installed, the purpose of the facility, the surrounding environment of the indoor unit, and the purpose of the spot in which the indoor unit is installed. The second environmental information obtains at least one of the location of the facility in which the chiller is installed, the purpose of the facility, the surrounding environment of the chiller, and the purpose of the spot in which the chiller is installed.

Examples of the air conditioner including the chiller disclose the following techniques.

Embodiment 12

A maintenance contract fee calculation system 1 that calculates a maintenance contract fee for an air conditioner 30 including an indoor unit 31 and a chiller, the maintenance contract fee calculation system 1 including an acquisition unit 11 and a calculation unit 12, in which the acquisition unit 11 is configured to obtain first environmental information related to an installation environment of the indoor unit 31 and second environmental information related to an installation environment of the chiller, and the calculation unit 12 is configured to calculate the maintenance contract fee in accordance with the first environmental information and the second environmental information.

The present system further discloses the following techniques.

Embodiment 21

A maintenance contract fee calculation system 1 that calculates a maintenance contract fee for an air conditioner 30 including an indoor unit 31 and an outdoor unit 32, the maintenance contract fee calculation system 1 including an acquisition unit 11 and a calculation unit 12, in which the acquisition unit 11 obtains first environmental information related to an installation environment of the indoor unit 31, second environmental information related to an installation environment of the outdoor unit 32, and an operation rate of the air conditioner, and the calculation unit 12 is configured to calculate the maintenance contract fee in accordance with the operation rate, the first environmental information, and the second environmental information. With this configuration, the operation rate is used to calculate the maintenance contract fee. Thus, the maintenance contract fee is calculated further efficiently.

The calculation unit 12, the air conditioning management device 40, 41, the information collection system 50, and the facility information management system 60 include one or more central processing units (CPU) or micro-processing units (MPU). The control unit may be circuitry including: (1) one or more processors that execute various processes according to a computer program (software); (2) one or more dedicated hardware circuits (application-specific integrated circuits: ASIC) that execute at least part of various processes, or (3) a combination thereof. The processor includes a CPU and memory such as RAM and ROM. The memory stores program code or commands configured to cause the CPU to execute processes. The memory, or computer-readable media, includes any type of media that is accessible by general-purpose computers and dedicated computers.

Although the present device according to the embodiment has been described above, it will be understood that various changes in form and details can be made without departing from the spirit and scope of the present device in the claims.

The invention claimed is:

1. A maintenance contract fee calculation system that calculates a maintenance contract fee for an air conditioner including an indoor unit and an outdoor unit, the maintenance contract fee calculation system comprising:
circuitry that
obtains first environmental information related to an installation environment of the indoor unit and second environmental information related to an installation environment of the outdoor unit; and
determines conditions in the first environmental information and the second environmental information expected to increase a failure rate of the air conditioner, and factors in the respective increases in failure rate of the determined conditions into the calculated maintenance contract fee, wherein
the first environmental information includes at least a surrounding environment of the indoor unit,
the surrounding environment of the indoor unit includes information about at least one of oil, humidity, water droplets, and dust,
the second environmental information includes at least a surrounding environment of the outdoor unit, and
the surrounding environment of the outdoor unit includes information about at least one of salt damage, sand, wind and rain, and snow.

2. The maintenance contract fee calculation system according to claim 1, wherein the circuitry obtains, as the first environmental information, at least one of a location of a facility in which the indoor unit is installed, purpose of the facility, a surrounding environment of the indoor unit, and purpose of a spot in which the indoor unit is installed.

3. The maintenance contract fee calculation system according to claim 1, wherein the circuitry obtains, as the second environmental information, at least one of a location of a facility in which the outdoor unit is installed, purpose of the facility, a surrounding environment of the outdoor unit, and purpose of a spot in which the outdoor unit is installed.

4. The maintenance contract fee calculation system according to claim 1, wherein the circuitry
further obtains setting information related to a setting of the air conditioner, and
calculates the maintenance contract fee in accordance with the first environmental information, the second environmental information, and the setting information.

5. The maintenance contract fee calculation system according to claim 4, wherein the setting information includes information about at least one of a length of piping connecting the indoor unit to the outdoor unit, a difference in height between the indoor unit and the outdoor unit, and a quantity of the indoor unit and the outdoor unit connected in each system.

6. The maintenance contract fee calculation system according to claim 1, wherein the circuitry
further obtains operation information related to operation data on the air conditioner, and
calculates the maintenance contract fee in accordance with the first environmental information, the second environmental information, and the operation information.

7. The maintenance contract fee calculation system according to claim 6, wherein the operation information includes information about at least one of an operation time, a thermo-on time, a quantity of start-and-stops, and a maximum load during a predetermined period.

8. The maintenance contract fee calculation system according to claim 1, wherein the circuitry
further obtains an operation period from a date when operation of the air conditioner started, and calculates the maintenance contract fee in accordance with the first environmental information, the second environmental information, and the operation period.

9. The maintenance contract fee calculation system according to claim 1, further comprising a learning unit that uses supervisor data including a first failure rate of the indoor unit based on the installation environment of the indoor unit and a second failure rate of the outdoor unit based on the installation environment of the outdoor unit to generate a calculation model for calculating the maintenance contract fee in accordance with the first environmental information and the second environmental information, wherein
the circuitry calculates the maintenance contract fee in accordance with the first environmental information, the second environmental information, and the calculation model.

10. The maintenance contract fee calculation system according to claim 2, wherein the circuitry obtains, as the second environmental information, at least one of a location of a facility in which the outdoor unit is installed, purpose of the facility, a surrounding environment of the outdoor unit, and purpose of a spot in which the outdoor unit is installed.

11. The maintenance contract fee calculation system according to claim 2, wherein the circuitry
further obtains setting information related to a setting of the air conditioner, and
calculates the maintenance contract fee in accordance with the first environmental information, the second environmental information, and the setting information.

12. The maintenance contract fee calculation system according to claim 3, wherein the circuitry
further obtains setting information related to a setting of the air conditioner, and
calculates the maintenance contract fee in accordance with the first environmental information, the second environmental information, and the setting information.

13. The maintenance contract fee calculation system according to claim 2, wherein the circuitry
further obtains operation information related to operation data on the air conditioner, and
calculates the maintenance contract fee in accordance with the first environmental information, the second environmental information, and the operation information.

14. The maintenance contract fee calculation system according to claim 3, wherein the circuitry
further obtains operation information related to operation data on the air conditioner, and
calculates the maintenance contract fee in accordance with the first environmental information, the second environmental information, and the operation information.

15. The maintenance contract fee calculation system according to claim 4, wherein the circuitry
further obtains operation information related to operation data on the air conditioner, and
calculates the maintenance contract fee in accordance with the first environmental information, the second environmental information, and the operation information.

16. The maintenance contract fee calculation system according to claim 5, wherein the circuitry
further obtains operation information related to operation data on the air conditioner, and
calculates the maintenance contract fee in accordance with the first environmental information, the second environmental information, and the operation information.

17. The maintenance contract fee calculation system according to claim 10, wherein the circuitry
further obtains operation information related to operation data on the air conditioner, and
calculates the maintenance contract fee in accordance with the first environmental information, the second environmental information, and the operation information.

18. The maintenance contract fee calculation system according to claim 11, wherein the circuitry
further obtains operation information related to operation data on the air conditioner, and
calculates the maintenance contract fee in accordance with the first environmental information, the second environmental information, and the operation information.

19. The maintenance contract fee calculation system according to claim 12, wherein the circuitry
further obtains operation information related to operation data on the air conditioner, and
calculates the maintenance contract fee in accordance with the first environmental information, the second environmental information, and the operation information.

20. The maintenance contract fee calculation system according to claim 2, wherein the circuitry
further obtains an operation period from a date when operation of the air conditioner started, and
calculates the maintenance contract fee in accordance with the first environmental information, the second environmental information, and the operation period.

* * * * *